Figure 1:
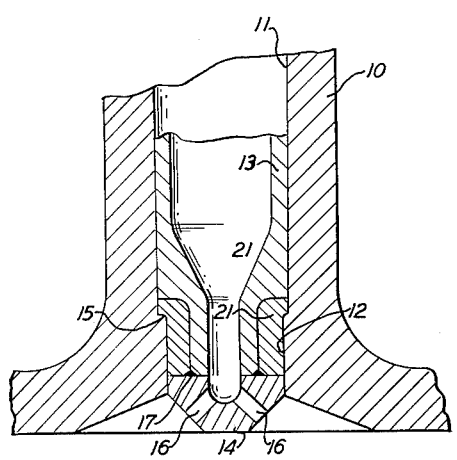

Sept. 12, 1961 J. LUSZNAT 2,999,484
PRECOMBUSTION CHAMBER
Filed Feb. 24, 1960

JOHANNES LUSZNAT
INVENTOR.

BY John R. Faulkner
Thomas H. Oster

ATTORNEYS

2,999,484
PRECOMBUSTION CHAMBER
Johannes Lusznat, Koln-Ehrenfeld, Germany, assignor to Ford Motor Company, Dearborn, Mich., a corporation of Delaware
Filed Feb. 24, 1960, Ser. No. 10,633
7 Claims. (Cl. 123—32)

This invention is concerned with a precombustion chamber body, precombustion chamber head and a jacket installed in the cylinder head of a diesel or multifuel engine and more particularly with means for prolonging the life of the precombustion chamber head.

Fuel is injected into the precombustion chamber body by a conventional injection nozzle (not shown). Partial combustion takes place in the precombustion chamber body and the burning gases are ejected into the main combustion chamber through ducts at a very high temperature. The thermal stress on the precombustion chamber head, particularly on the ducts, is very high and the ducts burn out in the course of time. This burn-out is assisted by the corrosive attack of lead oxides in leaded fuels. Since the burning gases are deflected in the ducts from the axial direction of the precombustion chamber body, erosion occurs in the ducts as an additional destructive attack.

It is well known in the art that in parts subjected to intense heat, for example, exhaust valves and exhaust valve seats, corrosion and erosion can be partially controlled by hard metal cladding. These hard metals, however, have the disadvantage that they cannot be machined with ordinary cutting tools but only with special grinding tools. This characteristic makes it almost economically impracticable to fabricate a precombustion chamber head with drilled ducts.

An extended life precombustion chamber body and precombustion chamber head can now be constructed according to the invention wherein the precombustion chamber body is fabricated from a steel of normal heat conductivity and a precombustion chamber head is fabricated from a steel of high heat resistance. The precombustion chamber head can be made from a number of different steels, some of which are shown on pages 1336–1339 of the sixth edition of "The Making, Shaping and Treating of Steel" (copyright date—1951). The precombustion chamber head is cast in a sand mold with the ducts cored. The precombustion chamber body is constructed of a lower grade steel possessing a normal heat conductivity. The precombustion chamber head and the precombustion chamber body are either welded together or are tightly pressed together in the assembled state within the cylinder head.

Since corrosion and erosion have an increasingly greater effect with increasing temperatures, the heat conductivity of the lower part of the precombustion chamber body is improved by providing the latter with a highly conductive metal jacket in good thermal contact with the precombustion chamber head and the cylinder block. The jacket may preferably be fabricated from copper or copper base alloys although aluminum, silver and alloys thereof may also be used.

Figure 2:
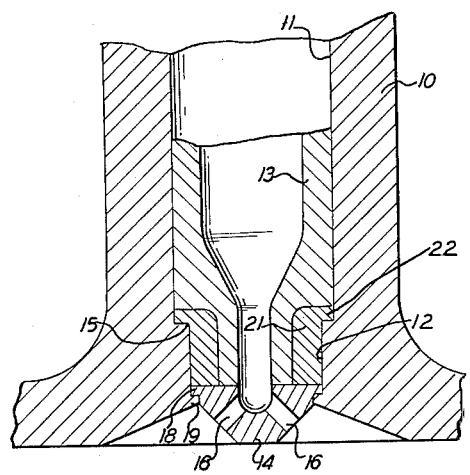
Figure 3:
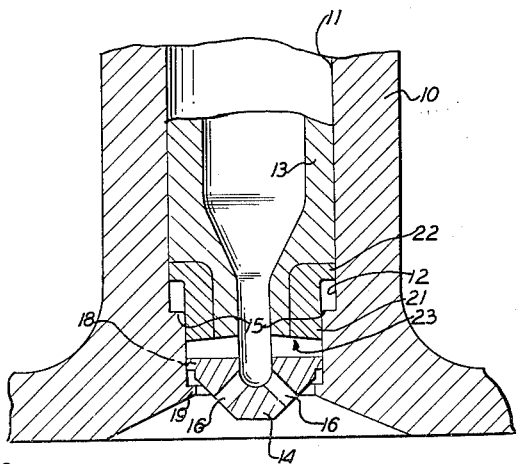

Details of the invention can best be understood by reference to the drawings in which:

FIGURE 1 is a cross-sectional view of a portion of a precombustion chamber body, precombustion chamber head and jacket installed in the cylinder head of an internal combustion engine wherein the precombustion chamber body and the precombustion chamber head are welded together; and FIGURE 2 is a cross-sectional view similar to FIGURE 1 and illustrates an alternate form of precombustion chamber body, precombustion chamber head and jacket wherein the adjacent contacting surfaces of the precombustion chamber head and the precombustion chamber body are tightly pressed together; and FIGURE 3 is a cross-sectional view of the construction of FIGURE 2 prior to the complete assembling of the parts.

In the embodiment shown in FIGURE 1, a portion of the cylinder head which houses the assembled precombustion chamber body, precombustion chamber head and jacket is indicated by reference numeral 10. Cylinder head 10 is provided with concentric bores 11 and 12 separated by shoulder 15. A hollow precombustion chamber body 13 is contained substantially within the bore 11 while a precombustion chamber head 14 is contained within the bore 12. Precombustion chamber body 13 defines the space wherein the precombustion takes place while the precombustion chamber head 14 has ducts 16 through which the charge passes into the combustion chamber. Precombustion chamber head 14 is cast with cored ducts 16 from a heat resistant steel. Precombustion chamber head 14 is welded at 17 to the precombustion chamber body 13.

FIGURES 2 and 3 disclose an alternative form of assembly of the precombustion chamber head and the precombustion chamber body which is obtained by pressing the two together. Because the precombustion chamber body is fabricated from a softer steel, the precombustion chamber body deforms under pressure to conform to the adjacent surface of the harder precombustion chamber head. In this embodiment of the invention the precombustion chamber head 14 is formed with a peripheral flange 18 adapted to seat on a flange 19 formed in the cylinder head 10 at the lower end of the bore 12.

In order to keep the temperature of the precombustion chamber body and particularly the precombustion chamber head as low as possible, the precombustion chamber body in each modification is suitably constructed of a ferritic steel which has a normal heat conductivity. Improved heat conductivity from the precombustion chamber head 14 is obtained by having a jacket 21, made of copper, silver, aluminum or their alloys, installed in the lower part of the precombustion chamber body 13. The jacket 21 is in good thermal contact with the precombustion chamber head 14 and the cylinder head and acts as a heat shunt in transferring heat primarily from the precombustion chamber head 14 to the cylinder head. Because of machining tolerances, it is possible that the precombustion chamber body 13 and the precombustion chamber head 14 will not be in full surface contact with the bores 11 and 12. Heat transfer from the highly heated precombustion chamber head 14 to the cylinder head is accelerated through the contact between the edge portion 22 of the jacket 21 and the shoulder 15 which separates the concentric bores.

In order to obtain good heat transfer and sealing in the construction of FIGURES 2 and 3, the lower surface 23 of the precombustion chamber body 13 and the jacket 21 is fabricated with a slight conical shape with an angle of about 1° toward the center. With the assembly of the precombustion chamber body in the cylinder head bore, the soft jacket will conform to the chamber head, thereby resulting in a good seal and good heat conductance.

It will be understood that the invention is not to be limited to the exact construction shown and described, but that various changes and modifications may be made without departing from the spirit and scope of the invention, as defined in the appended claims.

What is claimed is:
1. A precombustion chamber construction for a cylinder head comprising a hollow precombustion chamber body adapted to be mounted within the cylinder head, a precombustion chamber head secured to the precombustion chamber body and also adapted to be mounted within the cylinder head, a plurality of ducts extending through said precombustion chamber head and communicating with the interior of the precombustion chamber body, and a high thermal conductivity jacket disposed between a portion of the precombustion chamber head and the cylinder head.

2. A precombustion chamber construction comprising a cylinder head having a pair of concentric bores of different diameters, a hollow precombustion chamber body having a portion of its peripheral surface in contact with one of the two bores, a precombustion chamber head abutting said precombustion chamber body and having a portion of its peripheral surface in contact with the other of said bores and having at least one duct communicating with the interior of the precombustion chamber body, means securing the precombustion chamber head to the precombustion chamber body, and a copper jacket encircling one end of the precombustion chamber body and having a portion of its surface in engagement with one of the concentric bores and the precombustion chamber head.

3. A precombustion chamber construction comprising a cylinder head having a pair of concentric bores of different diameters, the smaller diameter bore having an annular flange at the lowermost end thereof, a hollow precombustion chamber body made from a ferritic material of high heat thermal conductivity having a substantial portion of its outer surface in contact with the larger of the two bores, a precombustion chamber head made from a high thermal heat resisting material mounted in surface contact with the precombustion chamber body and the smaller of said bores, said precombustion chamber head having a collar supported upon the flange of the smaller bore, at least one duct extending through said precombustion chamber head and communicating with the interior of the precombustion chamber body, means securing the precombustion chamber head to said precombustion chamber body, a jacket made from a high thermal conductivity material extending around the periphery of the precombustion chamber body and having surface contact with at least one of the bores and the precombustion chamber head.

4. A precombustion chamber construction comprising a cylinder head having a pair of substantially vertically disposed concentric bores separated by a shoulder, a hollow precombustion chamber body made from a high thermal heat conductivity material pressed in the upper of the two bores, a precombustion chamber head made from a high thermal heat resisting material pressed in the lower of the two bores abutting said chamber body, said precombustion chamber head having a plurality of ducts extending through said precombustion chamber head and in communication with the interior of said precombustion chamber body, a jacket made from a high thermal conducting material mounted upon the precombustion chamber body and in surface contact with the two bores, the shoulder portion separating the bores and the precombustion chamber head, said precombustion chamber body and said jacket having an angled configuration on the surface adjacent to said precombustion chamber head and deformable under pressure to sealingly engage the precombustion chamber head.

5. A precombustion chamber construction for a cylinder head comprising a hollow precombustion chamber body adapted to be mounted within the cylinder head, a precombustion chamber head adjacent said precombustion chamber body, said precombustion chamber head having a duct therethrough communicating with the interior of said precombustion chamber body, and a high thermal conductivity jacket disposed between a portion of said precombustion chamber head and the cylinder head.

6. The structure defined by claim 5 which is further characterized in that the adjacent surfaces of said precombustion chamber body and said precombustion chamber head are nonparallel, the surface of said precombustion chamber body being deformable under pressure.

7. A precombustion chamber construction comprising a cylinder head having a pair of concentric bores of different diameters, a hollow precombustion chamber body having a portion of its peripheral surface in contact with one of the two bores, a precombustion chamber head abutting said precombustion chamber body and having a portion of its peripheral surface in contact with the other of said bores and having at least one duct communicating with the interior of the precombustion chamber body, and a high thermal conductivity jacket encircling a portion of the precombustion chamber body and having surface contact with one of the concentric bores and the precombustion chamber head.

References Cited in the file of this patent

UNITED STATES PATENTS

| | | |
|---|---|---|
| 1,798,260 | Hehr | Mar. 31, 1931 |
| 2,057,318 | Schwaiger | Oct. 13, 1936 |
| 2,080,189 | Schwaiger | May 11, 1937 |